United States Patent [19]
Focke

[11] Patent Number: 4,976,584
[45] Date of Patent: Dec. 11, 1990

[54] APPARATUS FOR LOADING CARTONS ONTO PALLETS

[75] Inventor: Heinz Focke, Verden, Fed. Rep. of Germany

[73] Assignee: Focke & Co. (GmbH & Co.), Verden, Fed. Rep. of Germany

[21] Appl. No.: 423,748

[22] Filed: Oct. 19, 1989

Related U.S. Application Data

[63] Continuation of Ser. No. 266,250, Oct. 28, 1988, abandoned, which is a continuation of Ser. No. 39,868, Apr. 20, 1987, abandoned.

[30] Foreign Application Priority Data

Apr. 18, 1986 [DE] Fed. Rep. of Germany ....... 3613089

[51] Int. Cl.⁵ .............................................. B65G 61/00
[52] U.S. Cl. .............................. 414/789.6; 414/790.9; 414/792.9; 414/793.8; 414/799; 901/7
[58] Field of Search ........................................ 414/799

[56] References Cited

U.S. PATENT DOCUMENTS

| | | | |
|---|---|---|---|
| 1,556,078 | 10/1925 | Clymer | 414/69 |
| 3,313,376 | 4/1967 | Holland | 187/19 X |
| 4,184,799 | 1/1980 | Arndt | 414/71 X |
| 4,287,459 | 9/1981 | Dahlström | 901/7 X |
| 4,850,782 | 7/1989 | Focke | 414/793 |

FOREIGN PATENT DOCUMENTS

| | | | |
|---|---|---|---|
| 0131555 | 1/1985 | European Pat. Off. | |
| 1916395 | 10/1970 | Fed. Rep. of Germany | |
| 2918699 | 11/1979 | Fed. Rep. of Germany | |
| 2841195 | 3/1980 | Fed. Rep. of Germany | 414/84 |
| 3318492 | 11/1984 | Fed. Rep. of Germany | 414/70 |
| 3347474 | 2/1985 | Fed. Rep. of Germany | |
| 58-52117 | 3/1983 | Japan | 414/71 |

OTHER PUBLICATIONS

F & H, Fördern und Heben 35 (1985) No. 8, p. 586.
F & H, Fördern und Heben 34 (1984) No. 10, p. 738.
FMC Model 250 Robot Case Palletizer/Depalletizer Brochure; FMC Corp., Hoopeston Ill., Copyright 1984, Copy in Class 414, Sub. 71.

*Primary Examiner*—Robert J. Spar
*Assistant Examiner*—William M. Hienz
*Attorney, Agent, or Firm*—Sughrue, Mion, Zinn, Macpeak & Seas

[57] ABSTRACT

To transfer cartons (12) arriving on delivery conveyors (13, 14) onto pallets (10, 11), a pivoting conveyor (15) (robot) is used, and this takes up the cartons (12) by a suction head (17) and, by pivoting and moving up and down, feeds them to the pallet (10, 11). To reduce the lifting movements of an articulated arm (16) which are thereby necessary, by platforms (30, 31) movable up and down the cartons (12) are conveyed upwards or downwards to the articulated arm (16), so that the lifting movements of the latter are reduced correspondingly.

4 Claims, 2 Drawing Sheets

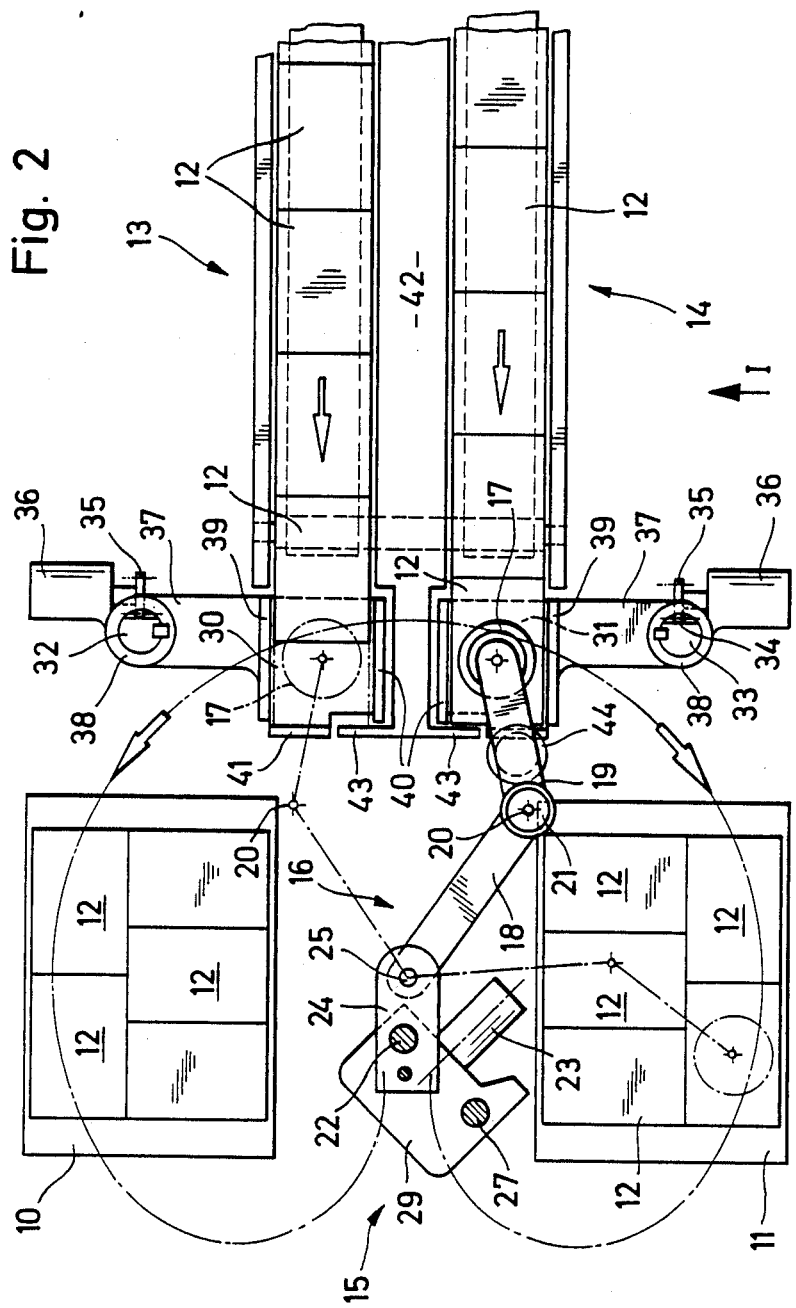

APPARATUS FOR LOADING CARTONS ONTO PALLETS

This is a continuation of Ser. No. 266,250, filed Oct. 28, 1988, now abandoned, which is a continuation of Ser. No. 039,868, filed Apr. 20, 1987, now abandoned.

BACKGROUND OF THE INVENTION

The invention relates to an apparatus for transferring articles, such as large packs, between a delivery or receiving plane and a depositing plane at a changing level, especially for transferring cartons supplied by delivery conveyors onto pallets, with an automatically operating, vertically movable pivoting conveyor receiving at least one carton each time.

Large packs or (large) cartons are stacked on pallets for dispatch. Recently, the pallets have been loaded by so-called robots, in particular automatically operating pivoting conveyors, in which a holder, conventionally a suction head, for grasping a carton or the like is attached to an articulated arm movable up and down and pivotable. At the same time, the pivoted conveyors are stationed next to the pallet and at the delivery end of a delivery conveyor, so that the pivoting arm takes up a carton from the delivery conveyor by means of the suction head, conveys it along an arcuate path and deposits it on the pallet or on a part stack which has formed.

As the stacking height of the cartons on the pallet increases, the articulated arm of the pivoting conveyor has to execute greater lifting movements between the delivery or receiving plane and the depositing plane on the pallet stack. This results in losses of time which can only be compensated to a limited extent by increasing the speed of movement.

SUMMARY OF THE INVENTION

The object on which the invention is based is to develop further and improve a transfer apparatus of the type mentioned in the introduction, in such a way that, without increasing the working speeds, it is possible to obtain a higher performance in the transfer of cartons or the like from a delivery conveyor onto a pallet.

To achieve this object, the apparatus according to the invention is characterized in that the arriving cartons (or other articles) can be fed to the pivoting conveyor by an elevator, in such a way that the carton is taken up by the pivoting conveyor in a take-up plane between the delivery or receiving plane and the depositing plane.

The elevator for the cartons, especially a platform movable up and down, takes over some of the lifting movement necessary for the cartons, so that the pivoting conveyor executes only very small lifting movements or none at all. In practical terms, the platform can be moved into a particular take-up plane which, in the light of all the cycles of movement, utilizes the performance of the platform on the one hand and of the pivoting conveyor on the other hand to maximum effect. At the same time, as a rule, the pivoting conveyor will also execute a certain lifting movement. The up-and-down movement of the platform acting as an elevator is controlled automatically as a function of the changing depositing plane which is sensed in an appropriate way.

To exploit the performances to the fullest possible extent, according to a further proposal of the invention two delivery conveyors for cartons, each with an independently raisable and lowerable platform on the end of the delivery conveyor, are assigned to a common pivoting conveyor. In this case, the pivoting conveyor is appropriately arranged between two pallets served alternately, which are supplied with cartons from both delivery conveyors.

Further features relate to the design of the delivery conveyors and of the platform.

An exemplary embodiment of the invention is explained in detail below with reference to the drawings. In these:

BRIEF DESCRIPTION OF THE DRAWING

FIG. 2 shows a plan view of the apparatus according to FIG. 1.

DETAILED DESCRIPTION OF A PREFERRED EMBODIMENT

Figure 1:
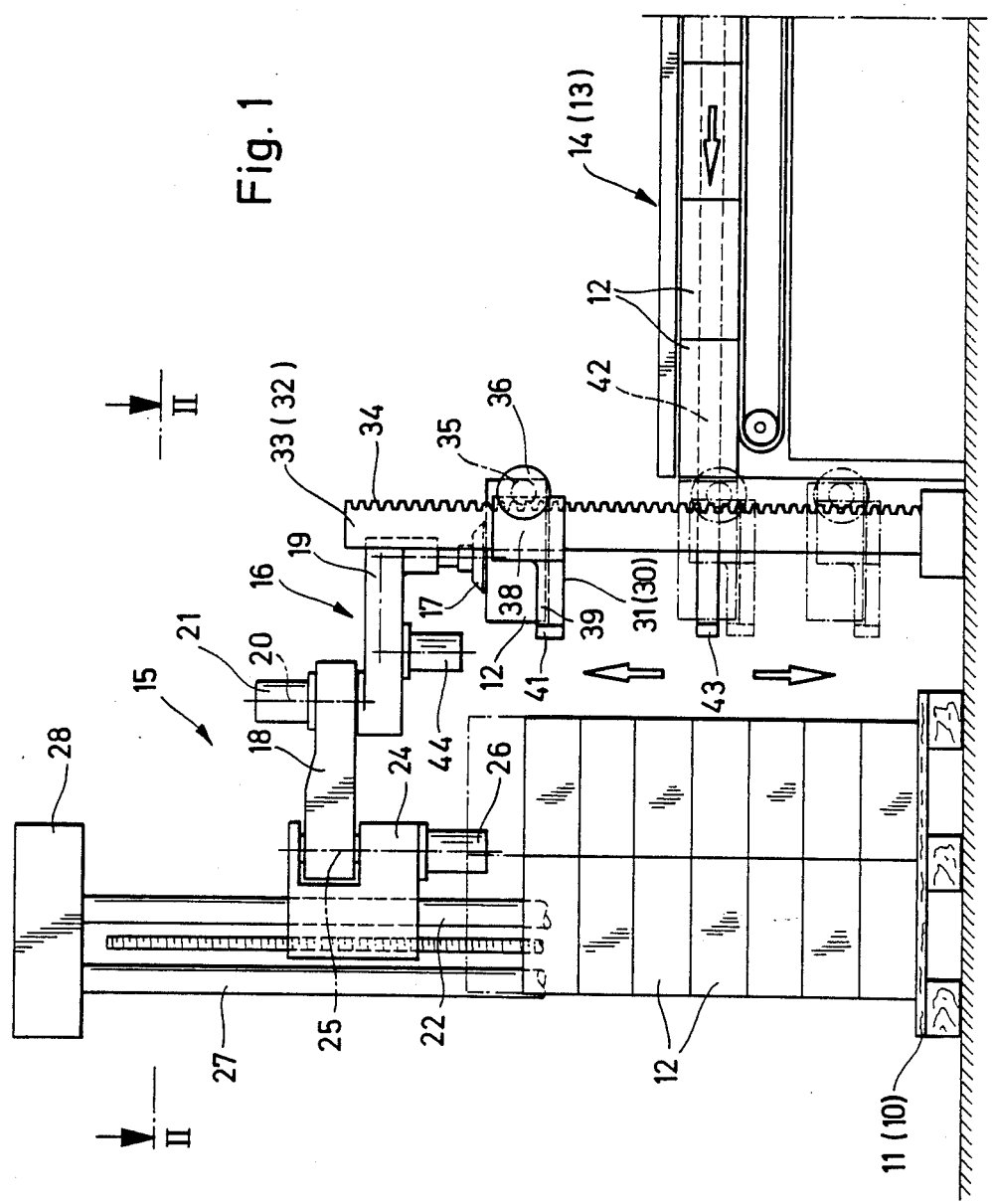
FIG. 1 shows a side view of an apparatus for loading pallets.

The apparatus illustrated is intended for loading large packs, particularly cartons 12, onto pallets 10, 11. The cartons 12 which, for example, can contain smaller packs are supplied on two delivery conveyors 13 and 14. These are designed as conveyor belts and can be driven continuously or intermittently. If the conveying movement is continuous, there must be a device for retaining the cartons 12 temporarily on the delivery conveyors 13, 14.

The cartons 12 are moved over or transferred from the delivery conveyors 13 and 14 onto one of two pallets 10, 11 by means of a pivoting conveyor 15 operating automatically. This is well known, in principle, as an industrial robot. A jointed articulated arm 16 movable horizontally and up and down is equipped, at the free end, with a grab device for grasping a carton 12, in particular, in the present case with a suction head 17. This each time grasps a carton 12 on the top side. As a result of an appropriate pivoting movement of the articulated arm 16, the carton 12 is supplied along an arcuate feed path to the pallet 10 or 11 and is deposited on this.

In the present example, the articulated arm 16 consists of two part arms 18 and 19 which can be bent relative to one another. These are connected to one another by means of a center joint 20. The particular relative angular position of the part arms 18 and 19 which is required is brought about by a servo-motor 21 assigned to the center joint 20. As a whole, the articulated arm 16 is movable up and down along a vertical guide column 22, specifically by means of a further servo-motor 23. At the same time, the articulated arm 16 is supported on a mounting 24 which is itself moved up and down on the guide column 22. In the region of the mounting 24, the articulated arm 16 is pivotable as a whole about a further vertical axis as a result of the formation of an end joint 25. The movements of the articulated arm 16 in the region of this end joint 25 are executed by means of a servo-motor 26 assigned to the latter.

Furthermore, the suction head 17 is rotatable about its own vertical axis by means of a further servo-motor 44, so that its relative position in relation to the cartons 12 to be transported can likewise be adjusted.

Because the articulated arm 16 is movable in the way described above in the vertical and the horizontal plane, any region of the pallet 10 can be covered, so that the cartons 12 can be stacked in the correct position on the pallet 10, 11 in the particular favourable relative arrangement desired.

For reasons of stability, a supporting column 27 is provided parallel to the guide column 22. The guide column 22 and the supporting column 27 are connected to one another at the top end by means of a crosspiece 28. At the bottom, the guide column 22 and supporting column 27 are anchored in a common machine bed 29, to which the servo-motor 23 is also attached.

As the stacking height on the pallets 10, 11 increases, the articulated arm 16 has to execute greater lifting movements in order to transfer the cartons 12. To avoid the losses of time resulting from this, separately controllable elevators are assigned respectively to the two delivery conveyors 13, 14. In the present exemplary embodiments, these are platforms 30 and 31 which, in the initial position, are adjacent to the delivery conveyors 13 and 14, so that the arriving cartons 12 are conveyed individually onto either of the platforms 30, 31 directly.

Three planes are therefore critical for the functioning of the apparatus. The delivery or receiving plane is defined by the delivery conveyors 13 and 14. The delivery or receiving plane is predetermined and invariable. A take-up plane is predetermined by the particular height of the platform 30, 31. Finally, the stacking height of the cartons 12 on the pallets 10, 11 determines the depositing plane. The two last-mentioned planes are variable and are identical only when the level of the stack of cartons on the pallet 10, 11 is the same as that of the delivery conveyors 13, 14.

The platforms 30, 31 are movable up and down. The movements or the (upper or lower) positions (take-up plane) are co-ordinated with the particular stack height of the pallets 10, 11, in such a way that the articulated arm 16, in order to take up a carton 12 from one of the platforms 30, 31, has to execute only a very small lifting movement or none at all. In particular, the movements are controlled so that the lifting and pivoting movements of the articulated arm 16, that is to say one work cycle of the latter, take up the same amount of time as an up-and-down movement of the platform 30, 31, including the take-up of a carton 12.

The platforms 30, 31 are mounted on vertical holding columns 32, 33. These have, on one side, a toothing 34 continuous over the entire height. A drive pinion 35 connected to the platform 30, 31 is driven by a drive motor 36 assigned to the respective platform 30, 31.

The holding columns 32, 33 are arranged at a distance from the delivery conveyors 13, 14. The platforms 30, 31 are connected, via supporting arms 37, to a bearing sleeve 38 which is movable up and down on the holding column 32, 33.

The platforms 30, 31 are equipped with lateral limitations for the alignment of the cartons 12, in particular vertical side walls 39, 40 and a transverse wall 41 on the side of the platform 30, 31 located opposite the delivery conveyors 13, 14. A fixed lateral guide 42 arranged between the two delivery conveyors 13, 14 extends into the region of the platforms 30, 31 and here forms transversely directed stop legs 43 likewise intended for aligning the cartons 12 on the platform 30, 31.

The performance of the pivoting conveyor 15 is increased considerably by means of the platforms 30, 31 movable up and down, so that two conveyors 13, 14 and two pallets 10, 11 can be served by a common pivoting conveyor 15. The platforms 30, 31 perform the function described, even in the region below the plane of the delivery conveyors 13, 14, that is to say at the start of stacking on the pallets 10, 11.

What is claimed is:

1. Apparatus for transferring articles, such as cartons, between a delivery or receiving plane and a depositing plane at a changing level, and for transferring cartons supplied by delivery conveyors onto pallets, with an automatically operating, vertically movable pivoting conveyor receiving at least one carton each time, characterized in that the arriving cartons (12) or the like can be fed to the pivoting conveyor (15) by an elevator, in such a way that the carton (12) is taken up by the pivoting conveyor (15) in a take-up plane between the delivery or receiving plane and the depositing plane;

in that at least two delivery conveyors (13, 14), each with a raisable and lowerable platform (30, 31), are assigned to a common pivoting conveyor (15) and are served alternately by said pivoting conveyor; and in that a fixed lateral guide (42) is arranged between the delivery conveyors and at the end has two transversely directed stop legs (43) for the cartons (12) on the platforms (30, 31).

2. Apparatus for transferring cartons between a fixed horizontal delivery plane and a horizontal depositing plane having a changing height created by stacking of the cartons, and for transferring cartons supplied by one or more horizontal delivery conveyor (13, 14) onto pallets, characterized by:

said one or more conveyors being of fixed height in said fixed delivery plane;

elevator means including a vertically movable horizontal platform (30, 31) for receiving arriving cartons (12) from said one or more conveyors in said fixed delivery plane, and for vertically moving the cartons (12) from the fixed delivery plane to a horizontal take-up plane of variable height but lying between the delivery and the depositing planes; and vertically movable pivoting conveyor means (15), having a maximum elevation which is greater than the difference in height between the take-up plane and the depositing plane, for taking up the cartons (12) from said take-up plane, and pivoting them, while executing a combined lifting and pivoting movement, into a depositing position in the depositing plane;

stop means (41 or 42,43), located in said delivery pane, for positioning arriving cartons on said platform (30,31 in said delivery plane;

wherein the arriving carton are conveyed individually onto said platform (30,31) and are taken off from said platform by the pivoting conveyor means (15) after a vertical movement of said platform; and wherein said stop means comprises first (41) and second (43) stops against which arriving cartons (12) come to rest in a proper position on said platform (30, 31), said first stop (41) comprising a transverse wall connected to said platform (30, 31), and said second stop (43) comprising a stop leg stationarily embedded in the delivery plane, said platform (30, 31) having vertical side walls (39, 40).

3. Apparatus according to claim 2 characterized in that at least two delivery conveyors (13, 14), each with a vertically movable said platform (30, 31), are assigned to a common said pivoting conveyor means (15) and are served alternately by said pivoting conveyor means.

4. Apparatus according to claim 2, characterized in that the height of said platform in said take-up plane is determined by a height of a stack of cartons in said depositing plane.

* * * * *